(12) United States Patent
Morey et al.

(10) Patent No.: US 10,889,448 B2
(45) Date of Patent: Jan. 12, 2021

(54) SYSTEMS AND METHODS FOR CHAIN WEAR ELONGATION MEASUREMENT AND DRIVE COMPENSATION

(71) Applicant: John Bean Technologies Corporation, Chicago, IL (US)

(72) Inventors: Owen Eugene Morey, Huron, OH (US); Scott E. Stang, Monroeville, OH (US)

(73) Assignee: John Bean Technologies Corporation, Chicago, IL (US)

( * ) Notice: Subject to any disclaimer, the term of this patent is extended or adjusted under 35 U.S.C. 154(b) by 0 days.

(21) Appl. No.: 16/663,689

(22) Filed: Oct. 25, 2019

(65) Prior Publication Data

US 2020/0130946 A1     Apr. 30, 2020

Related U.S. Application Data

(60) Provisional application No. 62/752,840, filed on Oct. 30, 2018.

(51) Int. Cl.
*B65G 43/02* (2006.01)
*B65G 23/14* (2006.01)
(Continued)

(52) U.S. Cl.
CPC ........... *B65G 43/02* (2013.01); *B65G 17/086* (2013.01); *B65G 21/18* (2013.01); *B65G 23/14* (2013.01);
(Continued)

(58) Field of Classification Search
CPC ........ B65G 23/16; B65G 43/02; B65G 23/14; B65G 23/44; B65G 21/18;
(Continued)

(56) References Cited

U.S. PATENT DOCUMENTS

| 1,948,090 A | * | 2/1934 | Alvey ...................... A23G 9/04 198/733 |
| 3,938,651 A | | 2/1976 | Alfred et al. |

(Continued)

FOREIGN PATENT DOCUMENTS

| EP | 1798168 A1 | 6/2007 |
| EP | 1855966 A1 | 11/2007 |

(Continued)

OTHER PUBLICATIONS

Extended European Search Report, dated Feb. 27, 2020, in EP Application No. 19205291.8, filed Oct. 25, 2019, 9 pages.

*Primary Examiner* — Mark A Deuble
(74) *Attorney, Agent, or Firm* — Christensen O'Connor Johnson Kindness PLLC

(57) ABSTRACT

Embodiments of the disclosure are directed to systems and methods for chain wear elongation measurement and drive compensation. In one embodiment, a chain system includes a chain including a plurality of links arranged in a continuous loop and having first measurement values for plurality of links and total chain length, wherein the chain is configured to rotate on a sprocket, and a chain elongation measurement system for counting the plurality of links of the chain and for determining total chain length to determine first chain elongation measurement values.

15 Claims, 11 Drawing Sheets

(51) Int. Cl.
   *B65G 23/44* (2006.01)
   *B65G 17/08* (2006.01)
   *B65G 21/18* (2006.01)

(52) U.S. Cl.
   CPC ...... *B65G 23/44* (2013.01); *B65G 2203/0291* (2013.01); *B65G 2207/44* (2013.01); *B65G 2207/48* (2013.01); *B65G 2811/095* (2013.01)

(58) Field of Classification Search
   CPC .......... B65G 2811/095; B65G 2207/48; B65G 2207/44; B65G 2203/0291; B65G 17/086; B65G 2203/0275; B65G 43/00
   See application file for complete search history.

(56) References Cited

U.S. PATENT DOCUMENTS

| | | | |
|---|---|---|---|
| 4,274,783 A | 6/1981 | Eineicher et al. | |
| 4,565,282 A * | 1/1986 | Olsson | B65G 17/385 198/778 |
| 4,850,475 A * | 7/1989 | Lupo | B65G 21/18 198/778 |
| 4,852,720 A * | 8/1989 | Roinestad | B65G 21/18 198/778 |
| 4,899,871 A | 2/1990 | Olsson | |
| 5,563,392 A | 10/1996 | Brown et al. | |
| 5,803,232 A | 9/1998 | Fröderberg | |
| 6,006,898 A * | 12/1999 | Odink | B65G 17/086 198/778 |
| 6,851,546 B2 | 2/2005 | Lodge | |
| 7,258,227 B2 * | 8/2007 | Rettore | B65G 21/18 198/778 |
| 7,909,943 B2 | 3/2011 | Baudis et al. | |
| 9,221,618 B2 | 12/2015 | Domenicucci et al. | |
| 9,222,861 B2 | 12/2015 | Urbanzyk et al. | |
| 2004/0226805 A1 * | 11/2004 | Lodge | B65G 43/02 198/810.02 |
| 2014/0102212 A1 * | 4/2014 | Urbanzyk | B65G 43/02 73/828 |
| 2016/0010977 A1 | 1/2016 | Frost et al. | |
| 2016/0090244 A1 | 3/2016 | Park | |

FOREIGN PATENT DOCUMENTS

| | | |
|---|---|---|
| EP | 2489612 A1 | 8/2012 |
| EP | 2810035 A1 | 12/2014 |

* cited by examiner

SYSTEMS AND METHODS FOR CHAIN WEAR ELONGATION MEASUREMENT AND DRIVE COMPENSATION

CROSS-REFERENCE TO RELATED APPLICATION

This application claims the benefit of U.S. Provisional Application No. 62/752840, filed Oct. 30, 2018, the entire contents of which are expressly incorporated herein by reference.

BACKGROUND

In spiral self-stacking conveyor belt systems as used in cooking and freezing applications, inner and outer drive chain wear elongation is a cause of regular maintenance for the conveyor systems. In some systems, the outer drive chain wear elongates more than the inner drive chain. Chain wear, as well as a lack of synchronization in chain wear, can result in increased maintenance schedules and potential damage to the systems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a spiral conveyor belt system is provided. The system includes: a spiral conveyor belt; inner and outer drive chains driving the spiral conveyor belt, the inner and outer drive chains each including a plurality of links arranged in a continuous loop, the inner drive chain having inner chain first measurements for plurality of links and total chain length and the outer chain having outer chain first measurements for plurality of links and total chain length, wherein the inner and outer drive chains have different first measurement values and wherein the inner and outer drive chains are configured to run at different speeds having a first speed ratio; and a chain elongation measurement system for counting the plurality of links of the inner and outer drive chains and for determining total chain length to determine inner and outer chain elongated measurements.

In accordance with another embodiment of the present disclosure, a method for chain elongation measurement and/or drive compensation in spiral self-stacking conveyor belt system having inner and outer drive chains is provided. The method includes: obtaining first chain measurement values including a first number of links and a first total chain length for each of the inner and outer drive chains, wherein the inner and outer drive chains have different first measurement values and wherein the inner and outer drive chains are configured to run at different speeds having a first speed ratio; after running the spiral self-stacking conveyor belt system for a period of time, counting the number of links of each of the inner and outer drive chains and determining total chain length of each of the inner and outer drive chains; and determining chain elongation measurement values for each of the inner and outer drive chains by comparing counted number of links and counted total chain length with the first number of links and the first total chain length for each of the inner and outer drive chains.

In accordance with another embodiment of the present disclosure, a drive chain system having first and second drive chains is provided. The drive chain system includes: first and second drive chains driving an object, the first and second drive chains each including a plurality of links arranged in a continuous loop, the first drive chain having first chain first measurement values for plurality of links and total chain length and the second chain having second chain first measurement values for plurality of links and total chain length, wherein the first and second drive chains have different first measurement values and wherein the first and second drive chains are configured to run at different speeds having a first speed ratio; and a chain elongation measurement system for counting the plurality of links of the first and second drive chains and for determining total chain length to determine first and second chain elongated measurements.

In accordance with another embodiment of the present disclosure, a method for chain elongation measurement and/or drive compensation having first and second drive chains to drive an object is provided. The method includes: obtaining first chain measurement values including a first number of links and a first total chain length for each of the first and second drive chains, wherein the first and second drive chains have different first measurement values and wherein the first and second drive chains are configured to run at different speeds having a first speed ratio; after driving the object for a period of time, counting the number of links of each of the first and second drive chains and determining total chain length of each of the first and second drive chains; and determining chain elongation measurement values for each of the first and second drive chains by comparing counted number of links and counted total chain length with the first number of links and the first total chain length for each of the first and second drive chains.

In accordance with another embodiment of the present disclosure, a chain system is provided. The chain system includes: a chain including a plurality of links arranged in a continuous loop and having first measurement values for plurality of links and total chain length, wherein the chain is configured to rotate on a sprocket; and a chain elongation measurement system for counting the plurality of links of the chain and for determining total chain length to determine first chain elongation measurement values.

In accordance with another embodiment of the present disclosure, a method for chain elongation measurement and/or drive compensation having a drive chain for driving an object or a conveyor chain for conveying workpieces is provided. The method includes: obtaining first chain measurement values including a first number of links and a first total chain length for the chain; after driving the object for a period of time, counting the number of links of the chain and determining total chain length of the chain; and determining chain elongation measurement values for the chain by comparing counted number of links and counted total chain length with the first number of links and the first total chain length.

In any of the embodiments described herein, the chain elongation measurement system determines the inner and outer chain elongated measurements while the spiral conveyor belt system may be running.

In any of the embodiments described herein, a system further may include a speed controller for controlling the speed of at least one of the inner and outer drive chains based on the inner and outer chain elongated measurements to adjust the speed ratio of the inner and outer drive chains from a first speed ratio to a second elongated speed ratio.

In any of the embodiments described herein, a system further may include an inner chain tensioner coupled to the inner drive chain and an outer chain tensioner coupled to the outer drive chain, wherein the chain elongation measurement system further measures the tensioner stroke of the inner chain tensioner in determining the inner chain elongated measurements and measures the tensioner stroke of the outer chain tensioner in determining the outer chain elongated measurements.

In any of the embodiments described herein, the inner first chain measurement, the outer first chain measurement, or both may be non-elongated chain measurements.

In any of the embodiments described herein, a system further may include inner and outer drive speed pick-up systems.

In any of the embodiments described herein, a first sensor for counting the plurality of links of the inner drive chain as it moves may be located at the inner drive speed pick-up system, and wherein a second sensor for counting the plurality of links of the outer drive chain as it moves may be located at the outer drive speed pick up system.

In any of the embodiments described herein, a third sensor may count total chain length of the inner drive chain by sensing one or more lobes on the inner drive chain as it moves, and a fourth sensor may count total chain length of the outer drive chain by sensing one or more lobes on the outer drive chain as it moves.

In any of the embodiments described herein, the inner and outer drive chains may be ball drive chains or roller drive chains.

In any of the embodiments described herein, a method may further include determining a relationship between the chain elongation measurement values of the inner drive chain and the outer drive chain.

In any of the embodiments described herein, a method may further include adjusting the speed of at least one of the inner and outer drive chains to change the speed ratio between the inner and outer drive chains based on the relationship between the chain elongation measurement values of the inner drive chain and the outer drive chain from the first speed ratio to a second elongated speed ratio.

In any of the embodiments described herein, determining chain elongation measurement values for each of the inner and outer drive chains may further include measuring the tensioner stroke of an inner chain tensioner coupled to the inner drive chain and measuring the tensioner stroke of an outer chain tensioner coupled to the outer drive chain.

In any of the embodiments described herein, at least one of a worn inner and outer drive chains may be replaced.

In any of the embodiments described herein, the worn inner and outer drive chains may be replaced at the same time or at a different time.

In any of the embodiments described herein, the chain elongation measurement system may determine the first and second chain elongated measurements while the object is being driven.

In any of the embodiments described herein, a system may further include a speed controller for controlling the speed of at least one of the first and second drive chains based on the first and second chain elongated measurements to adjust the speed ratio of the first and second drive chains from a first speed ratio to a second elongated speed ratio.

In any of the embodiments described herein, a system may further include a first chain tensioner coupled to the first drive chain and a second chain tensioner coupled to the second drive chain, wherein the chain elongation measurement system further measures the tensioner stroke of the first chain tensioner in determining the first chain elongated measurements and measures the tensioner stroke of the second chain tensioner in determining the second chain elongated measurements.

In any of the embodiments described herein, the first measurement values of the first chain, the second chain, or both may be non-elongated chain measurements.

In any of the embodiments described herein, a system may further include first and second drive speed pick-up systems.

In any of the embodiments described herein, a first sensor for counting the plurality of links of the first drive chain as it moves may be located at the first drive speed pick-up system, and wherein a second sensor for counting the plurality of links of the second drive chain as it moves may be located at the second drive speed pick up system.

In any of the embodiments described herein, a third sensor may count total chain length of the first drive chain by sensing one or more lobes on the first drive chain as it moves, and a fourth sensor may count total chain length of the second drive chain by sensing one or more lobes on the second drive chain as it moves.

In any of the embodiments described herein, the first and second drive chains may be ball drive chains or roller drive chains.

In any of the embodiments described herein, a method may further include determining a relationship between the chain elongation measurement values of the first drive chain and the second drive chain.

In any of the embodiments described herein, a method may further include adjusting the speed of at least one of the first and second drive chains to change the speed ratio between the first and second drive chains based on the relationship between the chain elongation measurement values of the first drive chain and the second drive chain from the first speed ratio to a second elongated speed ratio.

In any of the embodiments described herein, determining chain elongation measurement values for each of the first and second drive chains may further include measuring the tensioner stroke of a first chain tensioner coupled to the first drive chain and measuring the tensioner stroke of a second chain tensioner coupled to the second drive chain.

In any of the embodiments described herein, at least one of a worn first and second drive chains may be replaced.

In any of the embodiments described herein, the worn first and second drive chains may be replaced at the same time or at a different time.

In any of the embodiments described herein, the chain may be a drive chain for driving an object or a conveyor chain for conveying workpieces.

In any of the embodiments described herein, the chain elongation measurement system may determine the chain elongated measurements while the chain is moving.

In any of the embodiments described herein, a system may further include a speed controller for controlling the speed of the chain based on the chain elongated measurements to adjust the speed of the chain from a first speed to a second elongated speed.

In any of the embodiments described herein, a system may further include a chain tensioner coupled to the chain, wherein the chain elongation measurement system further measures the tensioner stroke of the chain tensioner in determining the chain elongated measurements.

In any of the embodiments described herein, the first chain elongation measurement values of the chain may be non-elongated chain measurements.

In any of the embodiments described herein, a system may further include a drive speed pick-up system.

In any of the embodiments described herein, a first sensor for counting the plurality of links of the chain as it moves may be located at the drive speed pick-up system.

In any of the embodiments described herein, a second sensor may count total chain length of the chain.

In any of the embodiments described herein, the chain may be a ball chain or a roller chain.

In any of the embodiments described herein, a method may further include adjusting the speed of the chain based on the chain elongation measurement values.

In any of the embodiments described herein, determining the chain elongation measurement values for the chain may further include measuring the tensioner stroke of a chain tensioner coupled to the chain.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Figure 1:
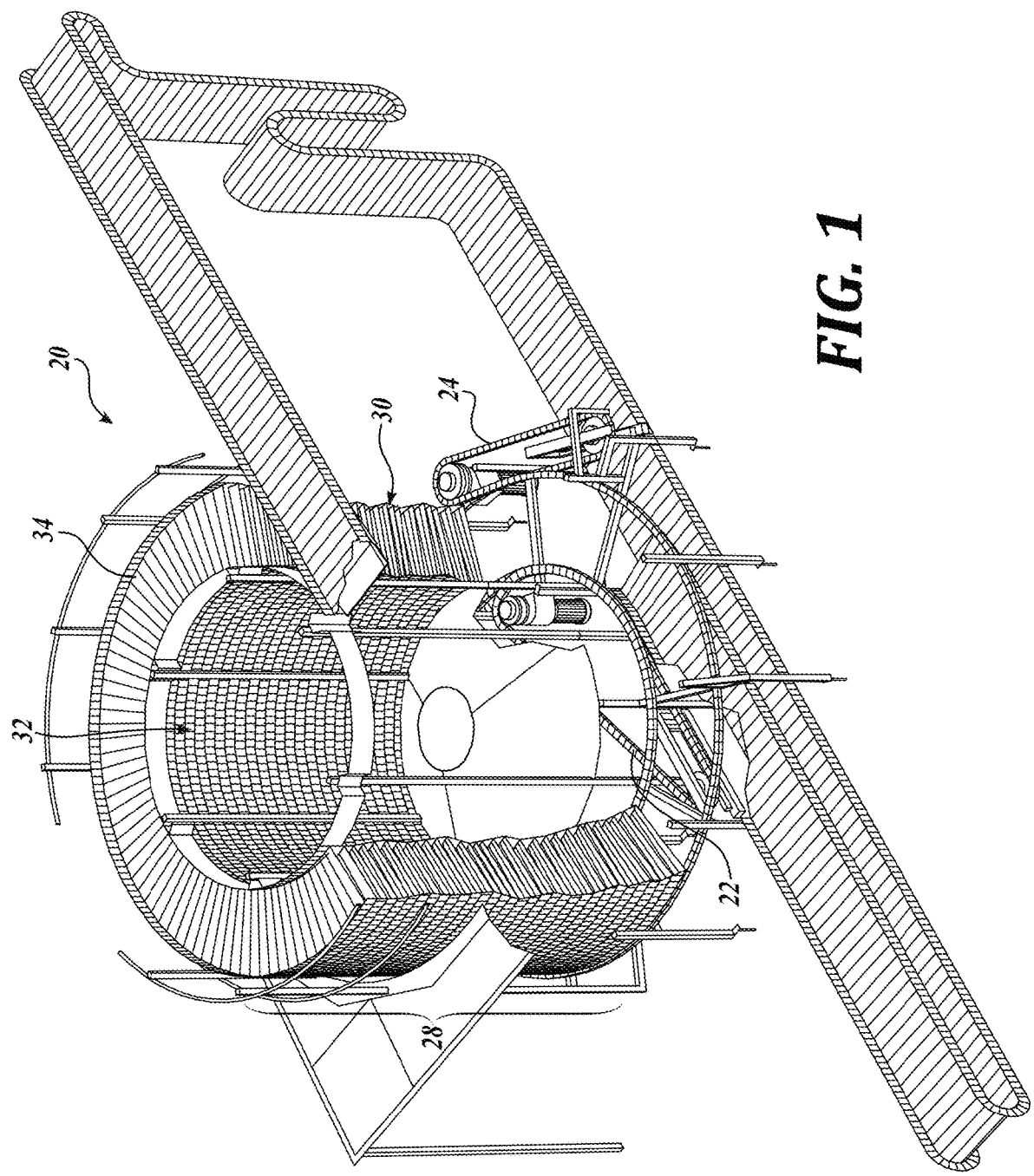
FIG. 1 is an isometric view of a spiral self-stacking conveyor belt system including a self-stacking conveyor belt and a drive system for driving the conveyor belt in accordance with embodiments of the present disclosure.
Figure 2:
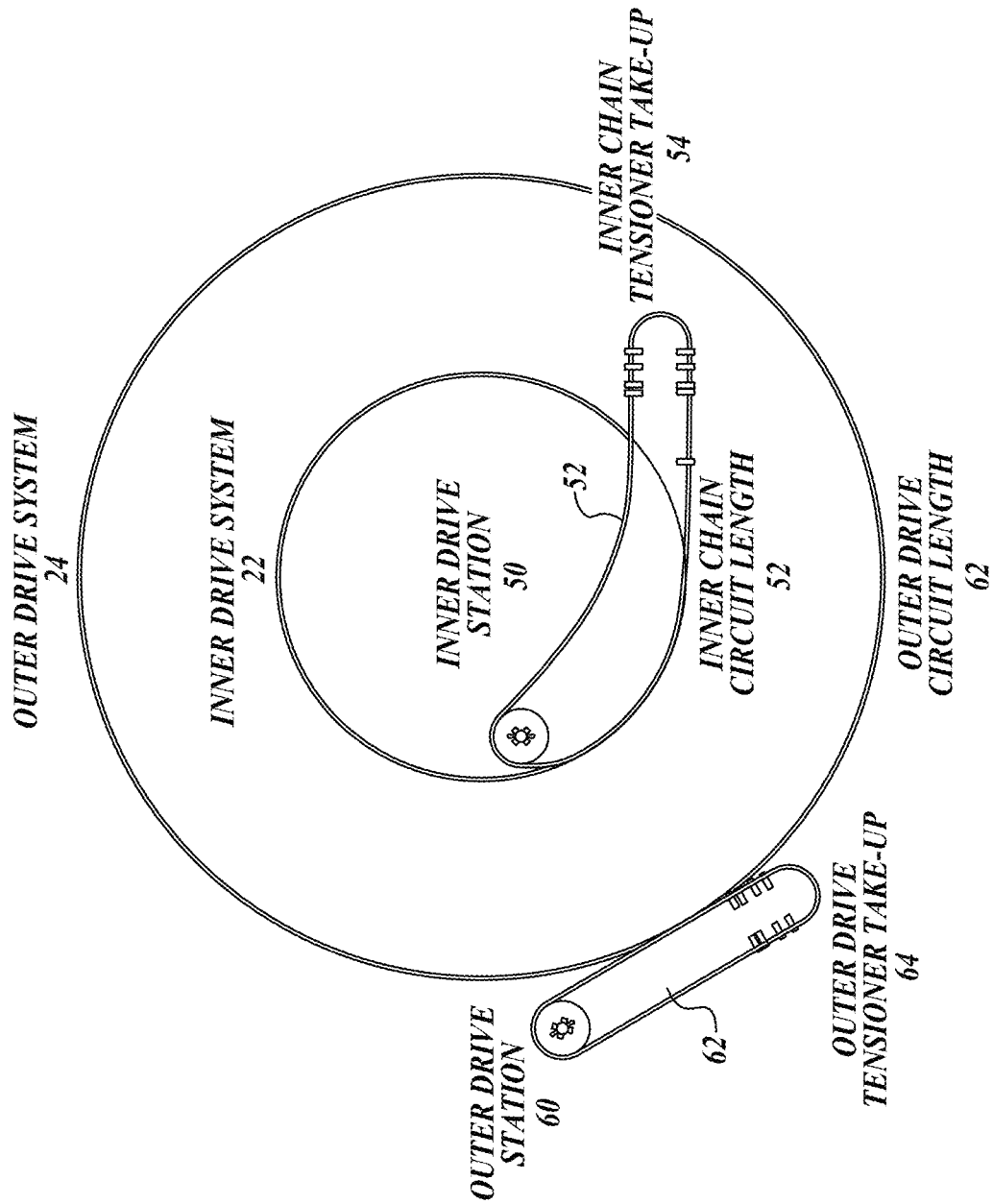
FIG. 2 is a top view of the spiral self-stacking conveyor belt system of FIG. 1 showing the inner and outer dive chains of the drive system.
Figure 3:
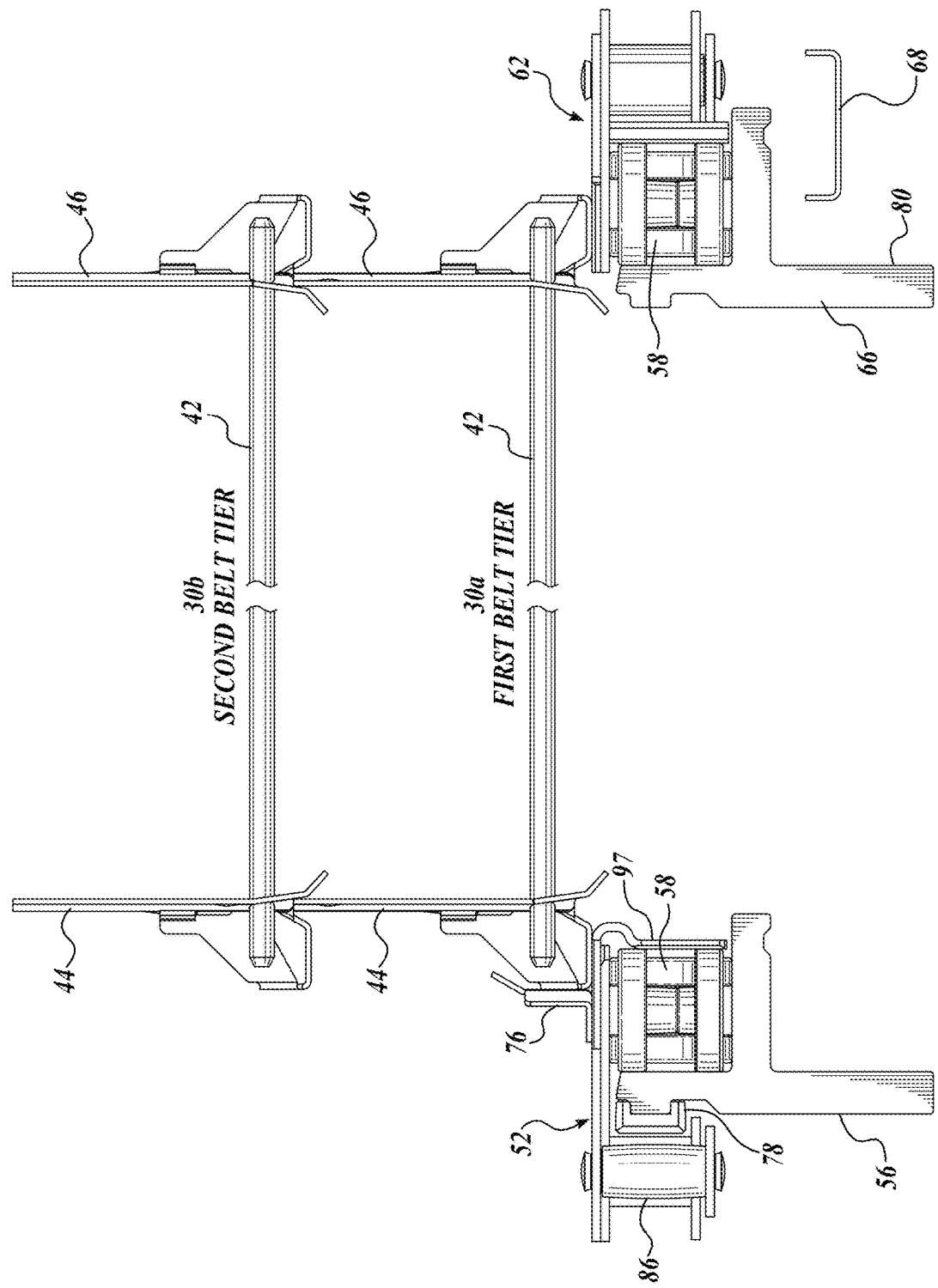
FIG. 3 is a cross-sectional end view of the spiral self-stacking conveyor belt system of FIG. 1 showing the inner and outer dive chains (roller chains) of the drive system.

Referring to FIGS. 1-3, embodiments of the present disclosure are directed to spiral self-stacking conveyor belt systems 20 driven by inner and outer drive systems 22 and 24 and components thereof. Such spiral self-stacking conveyor belt systems 20 are typically used in continuous heating and freezing operations, for example, cooking, proofing, drying, and freezing of food. The inner and outer drive systems 22 and 24 are generally manufactured from stainless steel components for corrosion resistance. In accordance with embodiments of the present disclosure, the conveyor belt system 20 includes a system for chain wear elongation measurement and/or drive compensation to manage drive chain wear elongation over extended periods of use.

Suitable embodiments of spiral self-stacking conveyor belts are shown and described in U.S. Pat. No. 3,938,651, issued to Alfred et al., and U.S. Pat. No. 5,803,232, issued to Frodeberg, the disclosures of which are hereby expressly incorporated by reference. However, other suitable spiral belt assemblies are also within the scope of the present disclosure. In addition, the systems and methods described herein may be applied to any chain system in which a quantity of pitches can be removed through the service life of the chain.

Although described and illustrated with respect to spiral self-stacking conveyor belts, embodiments of the present disclosure are also directed to drive chain systems and method of operating drive chain systems. Such drive chain systems and methods of operation may be used for other objects besides spiral self-stacking conveyor belts. In some embodiments, the drive chain systems include two drive chains to drive an object, with the first and second drive chains having different measurements in terms of number of links and total chain length and running at different drive speeds. In some embodiments, the systems described herein may include more than two chains. In other embodiments, the systems described herein may include one drive chain to transmit power to move something but is not in contact with workpieces. In yet other embodiments, the chain may be a conveying chain to transfer objects or workpieces (see e.g., FIGS. 10A and 10B). In accordance with embodiments of the present disclosure, systems and methods of operation are directed to chain wear elongation measurement and/or drive compensation to manage chain wear elongation over extended periods of use.

Referring to FIG. 1, when formed as a spiral stack 26, the pervious conveyor belt 34 (see close-up perspective view in FIG. 4) is configured into a plurality of superimposed tiers 30 that are stacked on top of each other (i.e., known in the art as "self-stacking" conveyor belt). In that regard, each tier 30 of the stack 26 forms a pervious annulus, through which gaseous cooking or cooling medium may travel, whether for cooking or freezing systems. When formed in a spiral stack 26, the plurality of tiers 30 creates an inner cylindrical channel 32, through which the gaseous medium may also travel. Workpieces (such as food products) travel on the conveyor belt 34 and are affected (either cooked or frozen) by gaseous medium in the cooking or freezing chamber. Exemplary spiral stacks 22 may have any number of tiers 30, typically in the range of about 8 to about 25 tiers for ovens, and typically in the range of about 30 to about 45 tiers for freezers.

Figure 4:
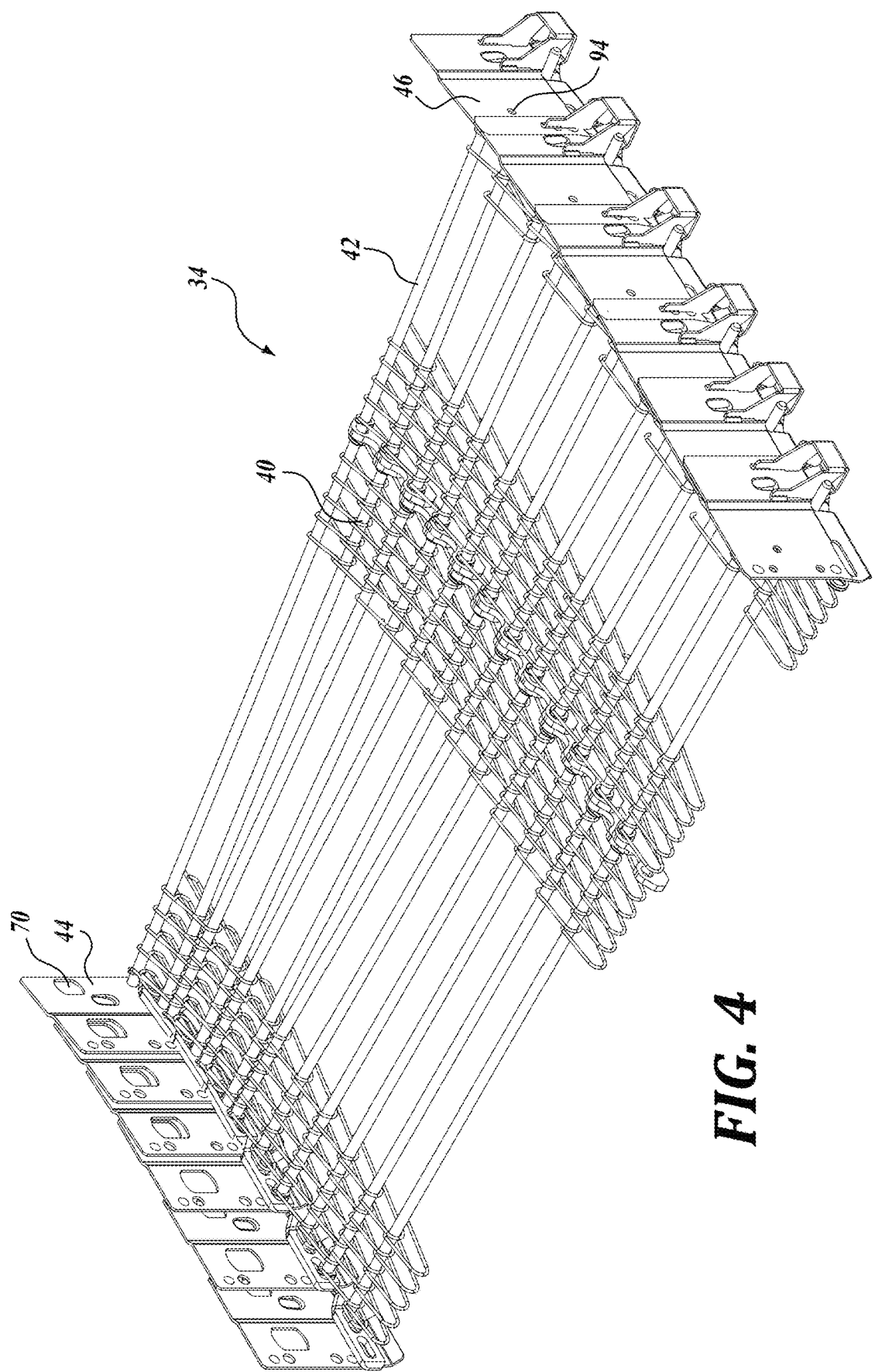
FIG. 4 is an isometric view of a portion of the conveyor belt in the spiral self-stacking conveyor belt system of FIG. 1.

Referring to FIG. 4, as a non-limiting example, the conveyor belt 34 may be in the form of a pervious belt mesh 40 for conveying workpieces and formed by transverse rods 42 interconnected by intermediate links, as well as inner and outer links 44 and 46 at the ends of the transverse rods 42. The inner and outer links 44 and 46 are configured to enable spiral self-stacking for the belt tiers 30 and for interaction with the drive system (see FIG. 3). When the conveyor belt 34 is configured as a spiral stack 26, gaseous medium may travel in a substantially vertical direction through the pervious belt mesh 40 of each superimposed tier 30. The inner links 44 are driven by an inner drive system 22 (including inner drive chain 52), and the outer links 46 are driven by an outer drive system 22 (including outer drive chain 62) (see FIGS. 2 and 3).

Referring to FIGS. 2 and 3, the conveyor belt 34 in the illustrated embodiment of FIG. 1 is driven by a drive system including inner and outer drive systems 22 and 24. The inner links 44 are driven by an inner drive system 22 (including inner drive chain 52), and the outer links 46 are driven by an outer drive system 24 (including outer drive chain 62). As seen in FIG. 2, the inner drive system 22 includes an inner drive station 50, an inner drive chain 52, and an inner chain tensioner take up 54. The outer drive system 24 includes an outer drive station 60, an outer drive chain 62, and an outer chain tensioner take up 64. The inner and outer drive chains 52 and 62 each include a plurality of links arranged in a continuous loop.

Because the conveyor belt 34 is configured to move in a spiral configuration, the inner and outer drive systems 22 and 24 drive the inner and outer edges of the conveyor belt 34 at different speeds to achieve the correct spiral belt motion. In some embodiments, the speed of the outer drive chain 62 is about two times as fast as the speed of the inner drive chain 52.

Referring to FIG. 3, the inner drive chain 52 is supported by an inner rail 56 and the outer drive chain 62 is supported by an outer rail 66. The inner and outer rails 56 and 66 also may include optional drip plates. For example, see the outer rail drip plate 68.

In the illustrated embodiment, the inner and outer drive chains 52 and 62 are roller chains. Therefore, when driven, rollers 58 enable movement of the inner and outer drive chains 52 and 62 along the inner and outer rails 56 and 66. Ball chains are also within the scope of the present disclosure, for example, as described in U.S. Pat. No. 4,899,871, the disclosure of which is expressly incorporated by reference herein.

As seen in FIG. 3, the inner and outer links 44 and 46 of the conveyor belt 34 interact with and are driven by the respective inner and outer drive systems 22 and 24 including respective inner and outer drive chains 52 and 62.

Figure 5:
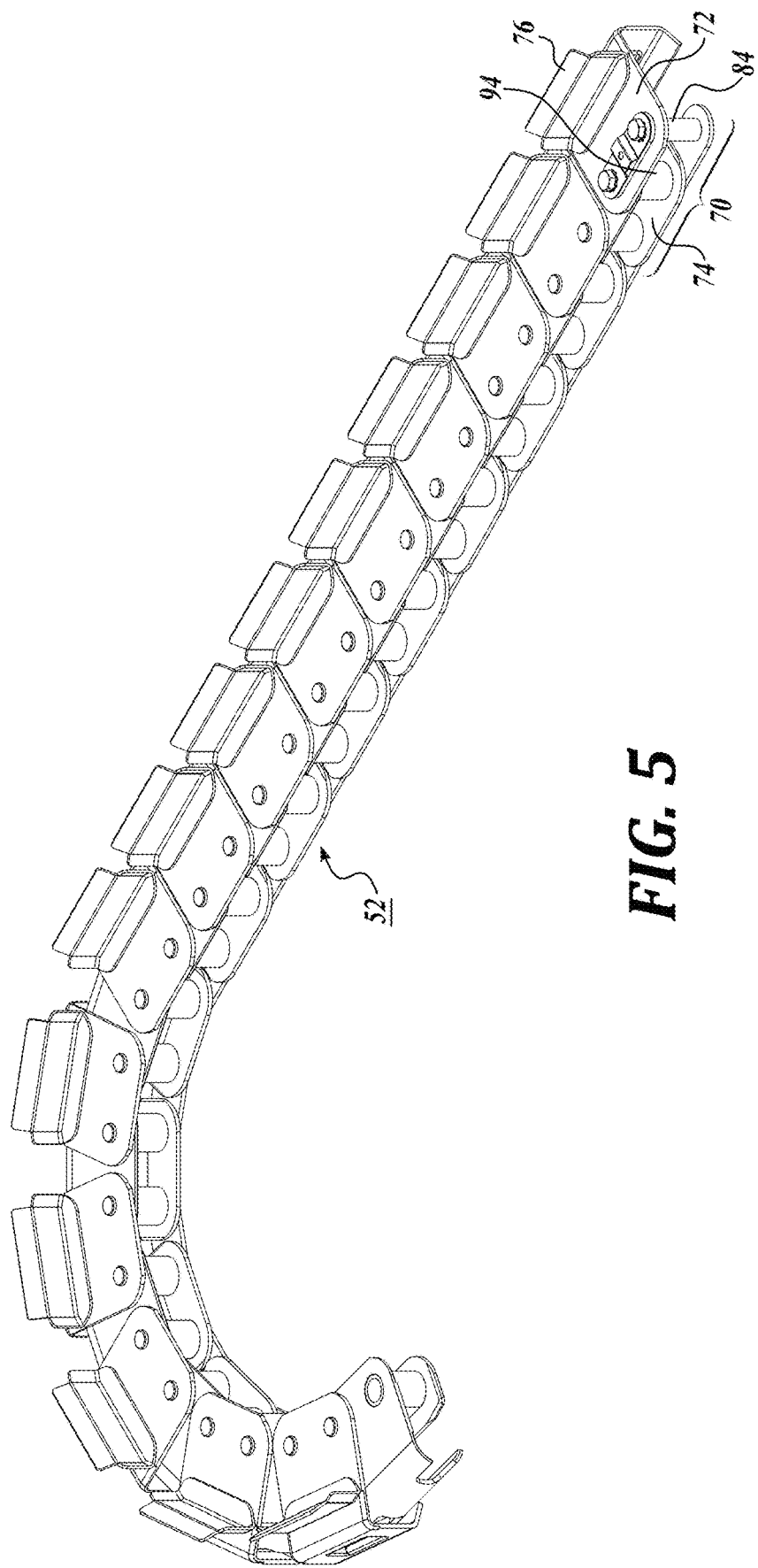
FIG. 5 is an isometric view of a portion of a drive chain in accordance with embodiments of the present disclosure.
Figure 6:
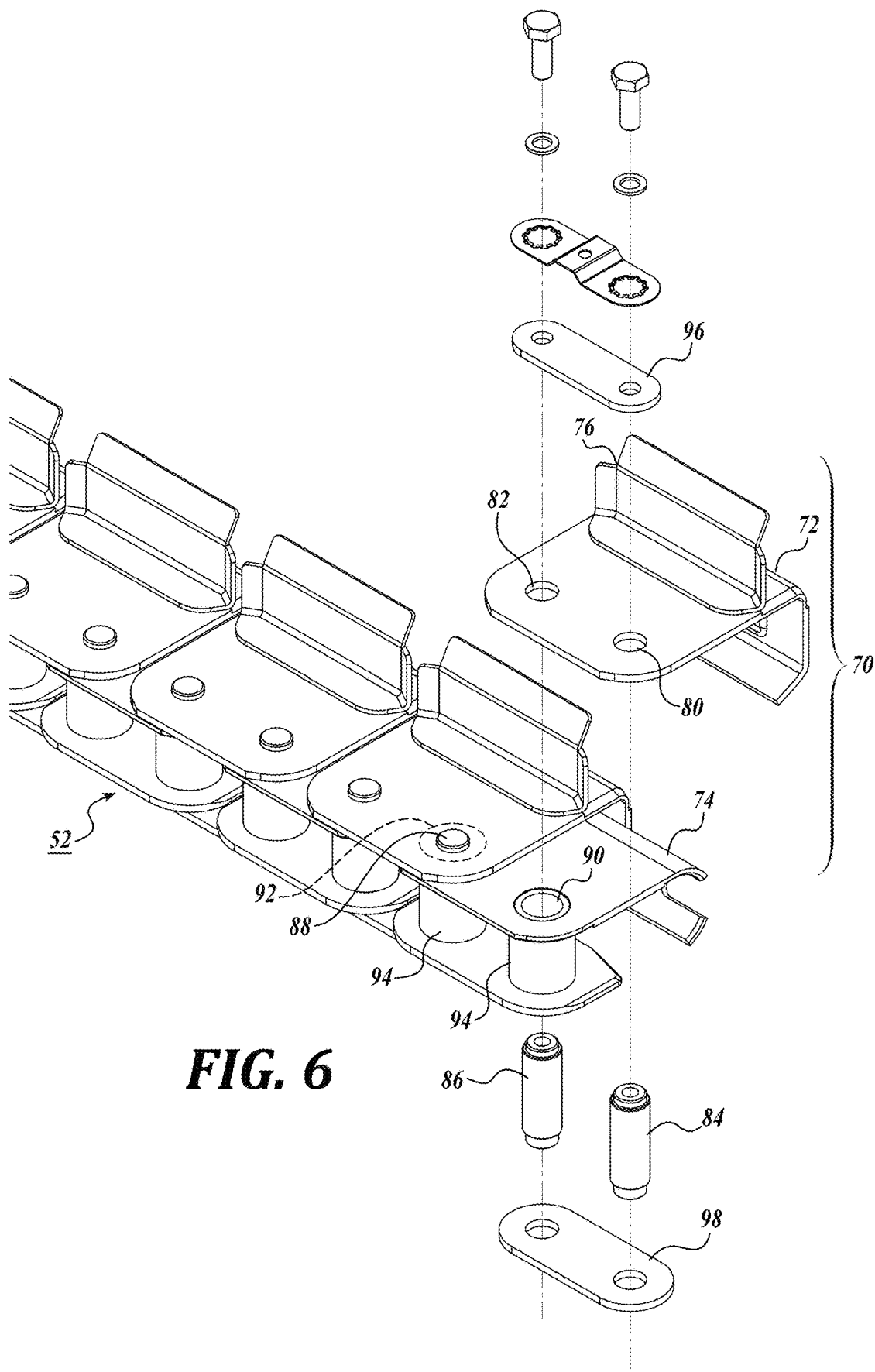
FIG. 6 is an exploded view of a portion of the drive chain of FIG. 5.

Referring to FIGS. 5 and 6, the inner drive chain 52 will be described in greater detail. Although shown as straight drive chain links in the embodiment of FIGS. 5 and 6, off-set links in chain constructions is also within the scope of the present disclosure.

The inner drive chain 52 is made up of a plurality of links 70 including first and second pitches 72 and 74. The first pitch 72 includes an upwardly extending flange 76 for interaction with the first tier 30a of the conveyor belt (see FIG. 3). The first and second pitches 72 and 74 are coupled to one another so as to enable coupling with adjacent links.

As seen in FIG. 6, the first pitch 72 includes two adjacent holes 80 and 82 for receiving coupling pins 84 and 86. The second pitch 74 includes two adjacent holes 90 and 92 for receiving second and third coupling pins 86 and 88. The second pitch 74 may include bushings 94 for receiving the second and third coupling pins 86 and 88. In the illustrated embodiment, the first and second pitches 72 and 74 share a common coupling pin 86.

In the illustrated embodiment, upper and lower plates 96 and 98 reinforce the coupling between links 70.

The first and second pitches 72 and 74 when assembled define a link 70 which can be linked to adjacent links to define the inner drive chain 52 (see, e.g., FIG. 5).

Referring to FIG. 3, the components of the outer drive chain 62 are substantially similar to the inner drive chain 52, except for differences regarding a glide strip 78 and the upward extending flange 76 only on the inner drive chain 52.

Elongation wear of the inner and outer drive chains 52 and 62 is a cause for regular maintenance for the spiral self-stacking conveyor belt system to remove chain links as the chains elongate. In addition, the outer drive chain 62 tends to elongate at a faster rate than the inner drive chain 52. Because the outer drive chain 62 elongates at a different rate than the inner drive chain 52, increased maintenance may result because the chains may need to be adjusted on different maintenance schedules and may need to be replaced more frequently.

Another problem arises when the outer drive chain 62 elongates at a different rate than the inner drive chain 52 and the inner and outer drive outputs are maintained in a fixed chain speed (RPM) relationship. In this situation, as the more worn chain (typically the outer chain 62) elongates, the chain speed increases relative to the less worn chain (typically the inner chain 52), resulting in an imbalance of forces applied to drive the conveyor belt at the inner and outer edges of the conveyor belt 34. In these cases, the more worn chain drive (typically the outer chain drive) becomes more loaded than the less worn chain drive (typically the inner chain drive), which can further accelerate chain wear elongation, can result in damage to the drive system, can result in damage to the conveyor belt, or a combination of results. Accordingly, embodiments of the present disclosure are directed to systems for chain wear elongation measurement, which may be combined with drive compensation in a spiral self-stacking conveyor belt system, as described in greater detail below.

In chain wear elongation, pitch length increases as pins and bushings apply tension forces to each other and oscillate against each other. Also environmental factors that are specific to the process and climate state in which the chain is used can influence the chain wear elongation rate. For example, high steam cooking conditions can have the effect of washing away chain lubrication, causing increases in frictional resistance and increased chain wear. As another example, application (oven or freezer) cleaning protocols can apply caustic chemicals or detergents that can remove chain lubrication, likewise causing increases frictional resistance and increased chain wear.

In some applications, chain wear elongation measurement values and/or the relationship between the chain elongation measurement values of the inner drive chain and the outer drive chain can be a function of one or more of the following conditions: saturated steam in the process (for example, in a temperature range of 190° F.-212° F.), elevated temperature operation as a function of the dew point temperature within the enclosure, the belt speed, or any combinations thereof. Therefore, understanding these factors and their effect on chain wear elongation measurement values can help predict corrective intervention solutions for predictive maintenance and timely component replacement.

Toward the end of chain service life, the physical elongation from pin-bushing wear can be as much as 3% of assembled chain length. Other wear in the system in addition to wear in the chain pins and bushings is seen in rail path, chain, sprocket, and idler wear depths. Over time, to adjust for wear elongation in the chain, pitches of chain are removed in two-pitch links to accommodate chain construction.

In an exemplary system, a new outer chain may include, for example, 552 pitches, with up to 14 pitches being removable for wear elongation adjustment. A new inner chain may include, for example, 396 pitches, with up to 10 pitches being removable for wear elongation adjustment. An example of chain wear elongation over time is provided below in Example 1.

EXAMPLE 1

Exemplary Chain Wear Elongation

In an exemplary drive system for a spiral stack conveyor belt, the outer drive chain has 276 links (552 pitches), and the initial chain length measurement is 1062, which is a reference measurement for a new ball chain. As seen in the data in Table 1 below, a chain elongates over time with up to 7 links removed and reaching a final operational state of 2.5% elongation and 7 links removed.

TABLE 1

| OUTER DRIVE CHAIN DATA | | | | | |
|---|---|---|---|---|---|
| TOTAL 38.1 mm PITCHES OUTER | PULSE COUNT PER CHAIN CYCLE AT SPEED PICKUP | TOTAL LINKS OUTER | TOTAL REMOVED LINKS | % ELONG. OUTER | CHAIN LENGTH MEAS. REFERENCE |
| 552 | 81213 | 276 | 0 | 0.0% | 1062 |
| 550 | 80919 | 275 | 1 | 0.4% | 1066 |
| 548 | 80625 | 274 | 2 | 0.7% | 1070 |
| 546 | 80330 | 273 | 3 | 1.1% | 1074 |
| 544 | 80036 | 272 | 4 | 1.4% | 1077 |
| 542 | 79742 | 271 | 5 | 1.8% | 1081 |
| 540 | 79448 | 270 | 6 | 2.2% | 1085 |
| 538 | 79153 | 269 | 7 | 2.5% | 1089 |

In the same drive system for a spiral stack conveyor belt, the inner drive chain has 198 links (296 pitches) and the initial chain length measurement is 1062 reference measurement for a new ball chain. As seen in Table 2 below, the chain elongates over time with up to 5 links removed and reaching a final operational state of 2.5% elongation and 5 links removed.

TABLE 2

| INNER DRIVE CHAIN DATA | | | | | |
|---|---|---|---|---|---|
| TOTAL 38.1 mm PITCHES INNER | PULSE COUNT PER CHAIN CYCLE AT SPEED PICKUP | TOTAL LINKS INNER | TOTAL REMOVED LINKS | % ELONG. INNER | CHAIN LENGTH MEAS. REFERENCE |
| 396 | 119057 | 198 | 0 | 0.0% | 1062 |
| 394 | 118456 | 197 | 1 | 0.5% | 1067 |
| 392 | 117855 | 196 | 2 | 1.0% | 1073 |
| 390 | 117254 | 195 | 3 | 1.5% | 1078 |
| 388 | 116652 | 194 | 4 | 2.0% | 1084 |
| 386 | 116051 | 193 | 5 | 2.5% | 1089 |

Differences in inner and outer chain wear becomes problematic because a 3% elongated chain runs 3% faster in speed compared to a new articulating chain on the same drive sprocket and at the same rotation rate. Some spiral conveyor systems can accommodate small differences in chain elongation and speed, for example, a 1% difference in chain elongation and speed between the inner and outer drive chains. The greater the differential wear between the inner and outer drives, the greater the driving force imbalance on the belt stack by the more heavily wear elongated chain. For example, after a certain amount of elongation of the outer drive chain 62 compared to the inner drive chain 52, the system may be driven primarily by the outer drive chain 62, which can result in accelerated elongation and eventual system failure, as described in Example 4 with reference to FIG. 8 below.

In some systems, chain tensioners applied to one or both of the inner and outer drive chains may help mitigate issues associated with differences in chain elongation and speed.

Figure 7A:
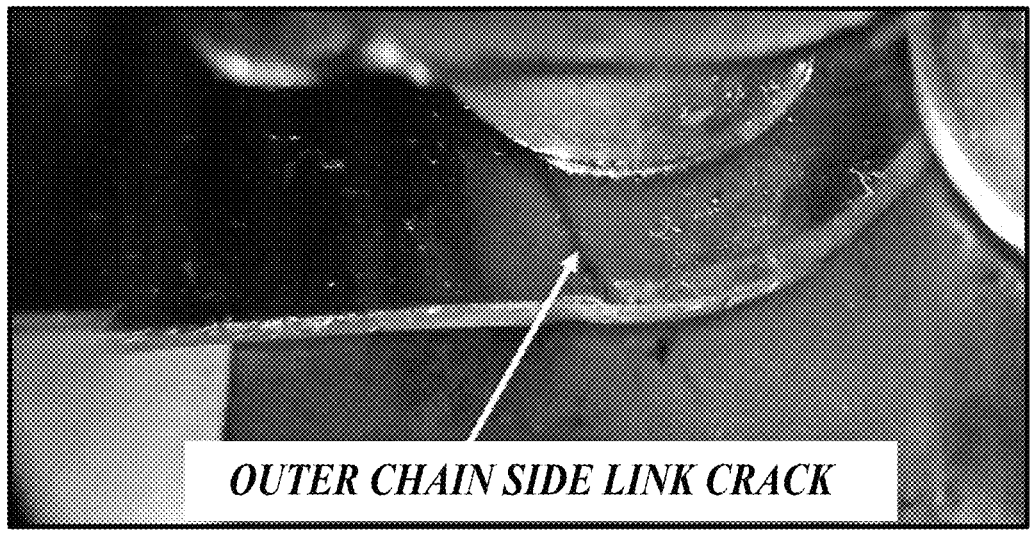
FIGS. 7A-7C are photographs of actual drive chain wear.
Figure 7B:
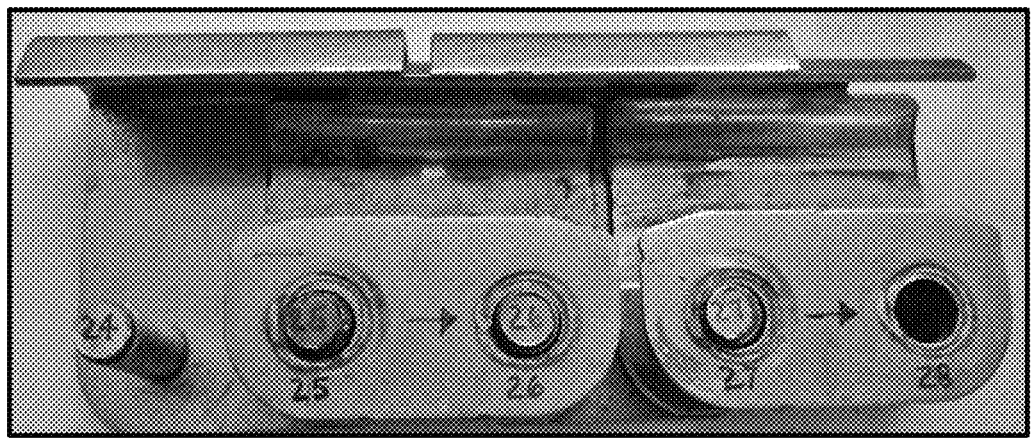
Figure 7C:
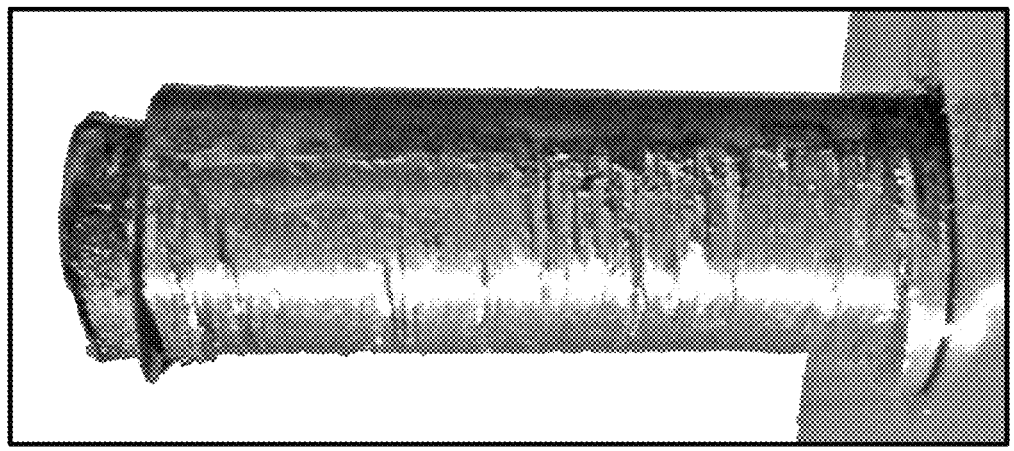

Referring to FIGS. 7A, 7B, and 7C, photographs of worn chain links are provided. Referring to FIG. 7A, a photograph of an outer chain side link fatigue crack is shown as a result of high outer chain tension. Referring to FIG. 7B, a worn chain sample photograph is provided, as described in greater detail below in Example 3. Referring to FIG. 7C, a worn pin photograph is provided. In the pin and bushing assembly, pins seem to wear at a faster rate than bushings. As described below in Example 3, pin wear in this non-limiting example accounts for about 95% of total wear elongation from the pin and bushing assembly, and bushing wear accounts for about 5% of the total wear elongation from the pin and bushing assembly.

EXAMPLE 2

Chain Elongation Problem

A problem situation was observed in which 12.5 inches of outer drive chain slip advance under the conveyor belt feed with the inner drive retarded negative (belt was going faster than the inner drive chain). Outer chain wear elongation was 1092 mm or 2.8% while the inner chain elongation was 1062 mm or 0% (essentially new chain). When a new (unworn) outer chain was installed, the drive system returned to a normal running condition.

EXAMPLE 3

Pin and Bushing Wear

Referring to FIG. 7B, four pins are identified as 24, 25, 26, and 27, and four bushings are identified as 25, 26, 27, and 28. Data is provided below in Table 1 based on wear measured on actual parts for the pins and the corresponding bushings.

TABLE 3

| PIN AND BUSHING ACTUAL WEAR. | | | | | | |
|---|---|---|---|---|---|---|
| | Pin outer diameter | | | Bushing outer diameter | | |
| | Unworn | Worn | Delta | Unworn | Worn | Delta |
| 24 | 12.03 | 11.76 | 0.27 | | | |
| 25 | 12.01 | 10.42 | 1.59 | 12.61 | 12.66 | 0.05 |
| 26 | 12.02 | 11.13 | 0.89 | 12.61 | 12.70 | 0.09 |

TABLE 3-continued

| PIN AND BUSHING ACTUAL WEAR. | | | | | | |
|---|---|---|---|---|---|---|
| | Pin outer diameter | | | Bushing outer diameter | | |
| | Unworn | Worn | Delta | Unworn | Worn | Delta |
| 27 | 12.02 | 10.75 | 1.27 | 12.60 | 12.65 | 0.05 |
| 28 | | | | 12.62 | 12.69 | 0.07 |

EXAMPLE 4

Chain Wear Elongation Acceleration

Figure 8:
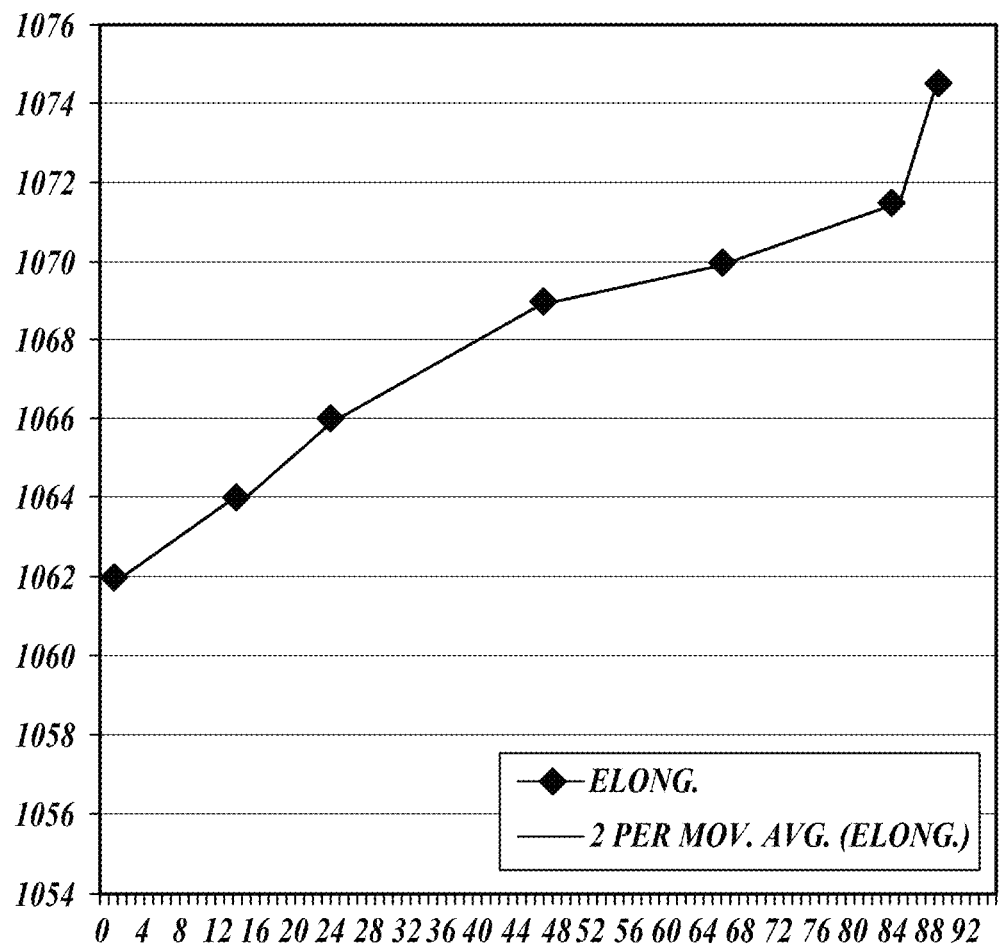
FIG. 8 is a graphical illustration of actual chain wear elongation data.

Referring to FIG. 8, chain wear elongation in chain length (mm) is illustrated over 88 days. Elongation is at a substantially linear rate up until day 84. After day 84, elongation is accelerated. It is believed after day 84, there is a greater driving force imbalance on the belt stack by the more heavily wear elongated chain (the outer chain) causing chain wear elongation to accelerate.

When a chain is worn to its pitch removal and elongation limits, the chain is replaced. In some spiral conveyor applications, the inner and outer chains can be replaced together as new chains to maintain torque measurements and load sharing on the belt edges. In other spiral conveyor applications, the outer chain is replaced twice as often as the inner chain. Such maintenance cycles for chain replacement may be predictable for scheduling, but may not take full advantage of chain wear life. Therefore, in some situations, chains may be replaced when they have life remaining.

Hardening of Chain Components

To mitigate chain wear elongation, embodiments of the present disclosure includes systems including hardened stainless steel components to reduce the elongation of the drive chains over extended periods of use.

In addition to chain wear elongation, galling, sometimes called cold welding, can also be a problem in drive chains. Galling is a form of severe adhesive wear which can occur when two metal surfaces are in relative motion to each other and under heavy pressure. Stainless steel components are susceptible to galling. When the two surfaces are the same material, these exposed surfaces can easily fuse together. Separation of the two surfaces can result in surface tearing and even complete seizure of metal components.

A galling threshold can be increased by the use of dissimilar materials (bronze against stainless steel), or using different stainless steels (martensitic against austenitic). Lubrication can help reduce the risks of galling. Also, high hardness for certain parts can reduce the risks of galling.

To increase the galling threshold and mitigate the risk of galling, embodiments of the present disclosure includes systems including hardened and/or dissimilar stainless steel components to mitigate the risk of galling.

In food processing applications, corrosion resistant steel is generally used for manufacturing assemblies. Corrosion resistant stainless steel is generally understood to refer to a non-ferrous material with at least 13% by weight of chromium added by an alloying process.

Austenitic Stainless Steel

Austenitic stainless steel is a group of stainless steel alloys classified by a crystalline structure having austenite as it primary crystalline structure (face centered cubic). An austenite crystalline structure is achieved by sufficient additions of the austenite stabilizing elements nickel, manganese and nitrogen. Due to their crystalline structure, austenitic steels are not hardenable by heat treatment and are essentially non-magnetic.

There are two subgroups of austenitic stainless steel. 300 series stainless steels achieve their austenitic structure primarily by a nickel addition while 200 series stainless steels substitute manganese and nitrogen for nickel, though there is still a small nickel content. Type 316 is a common austenitic stainless steel, which contains some molybdenum to promote resistance to acids and increase resistance to localized attack (e.g. pitting and crevice corrosion). The higher nitrogen addition in 200 series gives them higher mechanical strength than 300 series.

Because austenitic steel cannot be hardened by heat treatment, a process for manufacturing hardened components according to one embodiment of the present disclosure includes the acquiring the component (which may be stamped from an austenitic stainless steel strip) and treating the surfaces of the component. Treatment includes diffusing reinforcing atoms of carbon and/or nitrogen into the crystal lattice of the steel over a predetermined depth, preferably between 5 and 40 microns inclusive.

One suitable treatment may include subjecting the component to molten salt bath treatment, such as a Kolsterisation® treatment, as described in U.S. Pat. No. 7,909,943, issued Mar. 22, 2011, the disclosure of which is expressly incorporated herein by reference.

In the structure of austenitic stainless steel (a cubical face-centered lattice), Non-metal elements such as nitrogen and carbon can be present in a solid solution. If carbon or nitrogen or both elements are successfully diffused into the surface of an austenitic stainless steel and are kept there in a solid saturated or even over-saturated solution, then two effects will occur:

(a) If carbon is diffused in below the chromium carbide forming temperature (420-440° C.) and nitrogen is diffused in below the chromium nitride forming temperature (350-370° C.), no carbides or nitrides of the chromium will form. As a result, no chromium is extracted from the alloy matrix in the region of the diffusion layer and the corrosion resistance of the stainless steel is preserved.

(b) The diffused-in elements expand the austenitic lattice and result in high compressive stress in the diffusion zone, which in turn leads to a considerable increase in the hardness. In scientific literature, this is referred to as expanded austenite or S-phase, which can have a hardness of up to 1000 HV on the Vickers scale. Typical 300-series stainless steel has a hardness of 300-400 HV.

Other suitable treatments may include a gas treatment, a thermochemical treatment such as a case hardening, a nitridation, a nitrocarburization, an ion implantation, a diffusion heat treatment, etc.

Treatment is selected to obtain a hardening of the treated surfaces to a hardness selected from the group consisting of greater than 400 HV, greater than 450 HV, and greater than 500 HV.

Martensitic Stainless Steel

Martensitic stainless steel is another group of stainless steel alloys having a wide range of properties and used as stainless engineering steels, which can be heat treated to provide the adequate level of mechanical properties. The heat treatment typically involves three steps. Austenitizing heats the steel to a temperature in the range 980-1050° C., depending on the grade. The austenite is a face centered cubic phase. Quenching (a rapid cooling in air, oil or water) transforms the austenite into martensite, a hard body-centered tetragonal crystal structure. The as-quenched martensite is very hard and too brittle for most applications. Some residual austenite may remain. Tempering (i.e., heating around 500° C., holding at temperature, then air cooling) increases the tempering temperature decreases the Yield and Ultimate tensile strength but increases the elongation and the impact resistance.

In martensitic types, there is a subgroup of Precipitation Hardening grades: Grade EN 1.4542 (a.k.a 17/4 PH), which combines martensitic hardening and precipitation hardening. PH martensitic stainless steel achieves high strength and good toughness, and corrosion resistance similar to that of austenitic stainless steel.

In accordance with embodiments of the present disclosure, the inner and/or outer drive chains 52 and 62 may include one or more hardened and/or dissimilar components to reduce the wear elongation or galling of the drive chains. In one embodiment, the inner and/or outer drive chains 52 and 62 may include pins that are hardened and/or dissimilar from the other components in the drive chains 52 and 62. In another embodiment, the inner and/or outer drive chains may include hardened and/or dissimilar bushings in lieu of hardened and/or dissimilar pins or in addition to hardened and/or dissimilar pins. In another embodiment of the present disclosure, the outer drive chain 62 may include one or more hardened and/or dissimilar components, and the inner drive chain 52 may include no hardened and/or dissimilar components or different hardened and/or dissimilar components to try to accommodate differences in inner and outer drive chain wear.

As a non-limiting example, some components are made from PH martensitic stainless steel having a hardness of 40-44 Rc hardness (385-435 HV hardness), which is then subjected to a hardening treatment process that takes the particle hardness on the surface up over 60 Rc (746 HV).

In some embodiments of the present disclosure, some components of the drive system are made from hardened PH martensitic stainless steel having a hardness of greater than 400 HV, greater than 450 HV, and greater than 500 HV.

Chain Wear Elongation Measurement and Compensation System

Figure 10A:
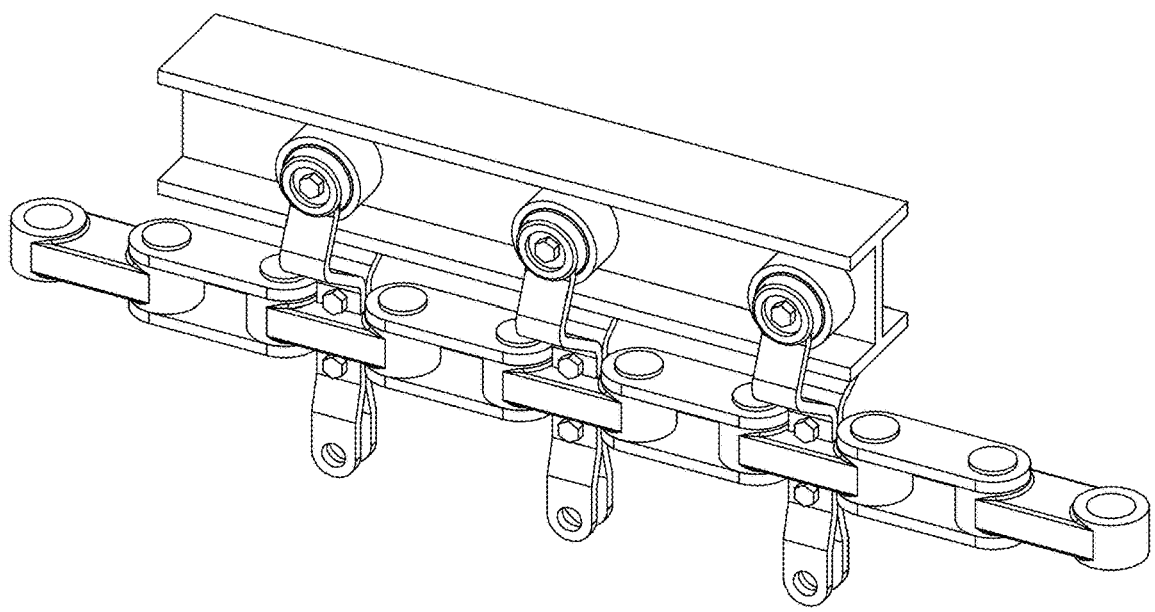
FIGS. 10A and 10B are views of drive chain systems for conveying having a single chain.
Figure 10B:
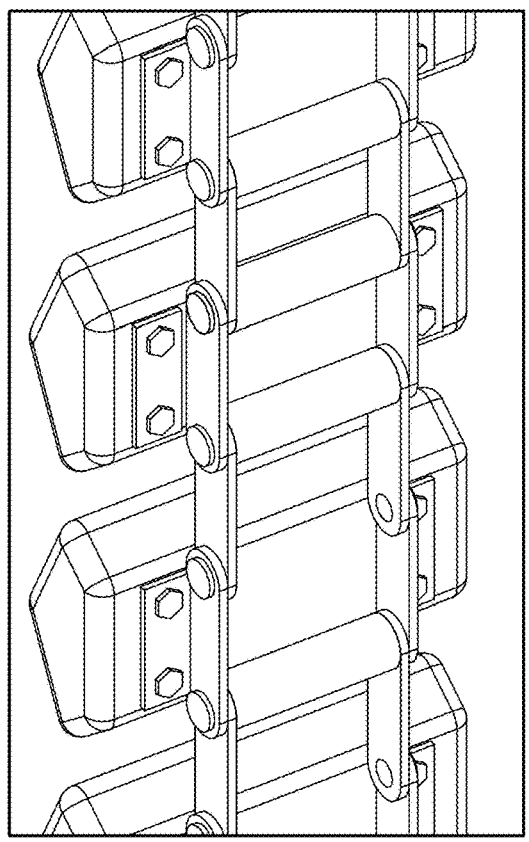

In addition to or as an alternative to hardened components in the drive system, a chain wear measurement system can be used to mitigate problems associated with chain wear. In accordance with one embodiment of the present disclosure, a chain wear measurement system measures individual chain wear values. In one embodiment, the chain wear measurement system measures individual chain wear values of the outer and inner drive chains, for example, of a spiral conveyor in the illustrated embodiment of FIGS. 1-3. In another embodiment, the chain wear measurement system measures individual chain wear values of the first and second drive chains. In another embodiment, the chain wear measurement system measures the chain wear values for a single chain. Suitable single chain systems may include, but are not limited to, a single drive chain system for driving an object or single conveyor chain system for conveying workpieces. Illustrations or exemplary conveyor chain systems are shown in FIGS. 10A and 10B.

The method for chain wear measurement involves simultaneously counting the number of chain pitches articulating the sprockets at each drive station per full chain travel cycle.

With known chain length and a known number of pitches, the total amount of chain length in chain pitches at each drive station can be determined while the system is running Knowing how much chain exists within each drive subsystem directly correlates with a wear elongation measurement of each chain.

In some systems described herein, chain wear elongation measurements can be used to manage and tune the drive speed of the chain or the drive ratio between multiple chains to optimize the performance of the system.

In the illustrated embodiment of FIGS. 1-3, the inner and outer drive systems of the spiral self-stacking conveyor belt are designed to match up and drive the spiral rotation of the conveyor belt. Each drive system should impart even drive forces to the driven conveyor belt so as to reduce force imbalance and potential damage to the conveyor belt. Symptoms of drive imbalance include, for example, cracked belt rod welds, crushed bushings, rapid (accelerated) outer chain wear out. Problems associated with accelerated chain wear and belt damage can be observed in both cooking and freezing spiral conveyor belt applications.

Most systems run a fixed drive ratio between the inner and outer drive systems based on the required belt speed with new chains. Embodiments of the present disclosure are directed to a variable drive ratio that compensates drive speed to account for differences in chain wear elongation.

Chain Wear Elongation

Comparing chain length when a chain is new in the system to monitored chain length as it wears is an expression of chain wear elongation.

Over the life of the chain, chain links are generally removed as the chain wears to as much as 2.5% to 3% wear elongation. It is a maintenance practice to remove links of chain over the life span of the chain as the chain wear elongates. Therefore, a monitored output of total length of chain residing in the system helps to guide maintenance practice. Another output of chain wear elongation over time is the number of chain links or chain pitches removed over time.

A chain tensioner can be used to maintain consistent pretension on the chain drive. Supplemental information in the chain wear elongation determination can be provided by tracking the position of the chain tensioner stroke position in between chain link removal events.

The information gathered by a chain wear elongation measurement system in accordance with embodiments of the present disclosure, with or without the supplementary tensioner position sensing, can be used either by semi-automated or fully-automated means to synchronize by tuning the speed ratio between two drives or for optimizing a single drive. Tuning can be used to compensate for the chain speed difference between two drive chains, which is brought on by differential wear elongation between the two drive chains. In a single drive chain system, tuning can be used to optimize drive speed and performance of the system.

Determining Chain Wear Elongation

In accordance with one embodiment of the present disclosure, a method to measure chain wear elongation in each drive requires two basic inputs, as detailed below.

First, count the rotations of the drive output shaft to count the number of chain pitches (or for straight side bar chains, count the number of chain links, which are equal to two pitches) articulating the sprockets at each drive station. The number of chain pitches also can be achieved by counting the electric motor rotations connected by positive transmission driving each drive station.

Of note, it is the designer's option to determine how many lobes may be used to express chain length. In embodiments of the present disclosure, entire chain length can be expressed by the number of pitches in the drive chain, by the number of links in the drive chain, or by another suitable measurement. Sensor pulses at an electric motor can be a direct measurement of the chain length in sensor pulse counts, which can be translated from pulses to another chain length unit of measure.

Second, determine the chain cycle completions to determine the total chain circuit lengths.

The combination of drive shaft revolutions per chain cycle gives the chain lengths per each drive and is described by the following relationship:

Measured Total Number of Chain Pitches per Circuit Length=(Revolutions/Chain Travel Circuit Cycle)×Number of Sprocket Teeth This overall chain length circuit measurement in pitches of chain is the input for determining overall total chain wear elongation within each chain that resides on each drive per the following relationship:

% Wear Elongation=100×(1−(Measured Total Number of Chain Pitches/Measured Total Number of Chain Pitches When New))

More resolution may be optionally created and added to this algebraic function if linear displacement sensors are applied to measure the chain tensioner extension. The equation with chain tension stroke considered is as follows:

% Wear Elongation=100×(1−((Measured Total Number of Chain Pitches+(2×Tensioner Stroke in Chain Pitch Units))/Measured Total Number of Chain Pitches When New))

Each drive fitted with sensors that result in a count of drive shaft revolutions and simultaneously sense chain length cycles can provide an output of percent chain wear elongation measures per each drive. Optionally, a tensioner position sensor, such as a linear displacement transducer at each chain tensioner, can be used for additional resolution.

In accordance with another embodiment of the present disclosure, another chain wear elongation measurement method simplifies the system down to the minimum amount of required sensor components. The sensing system includes counting sensors on each electric motor and the counting sensors for each of the chain travel cycles only.

Figure 9:
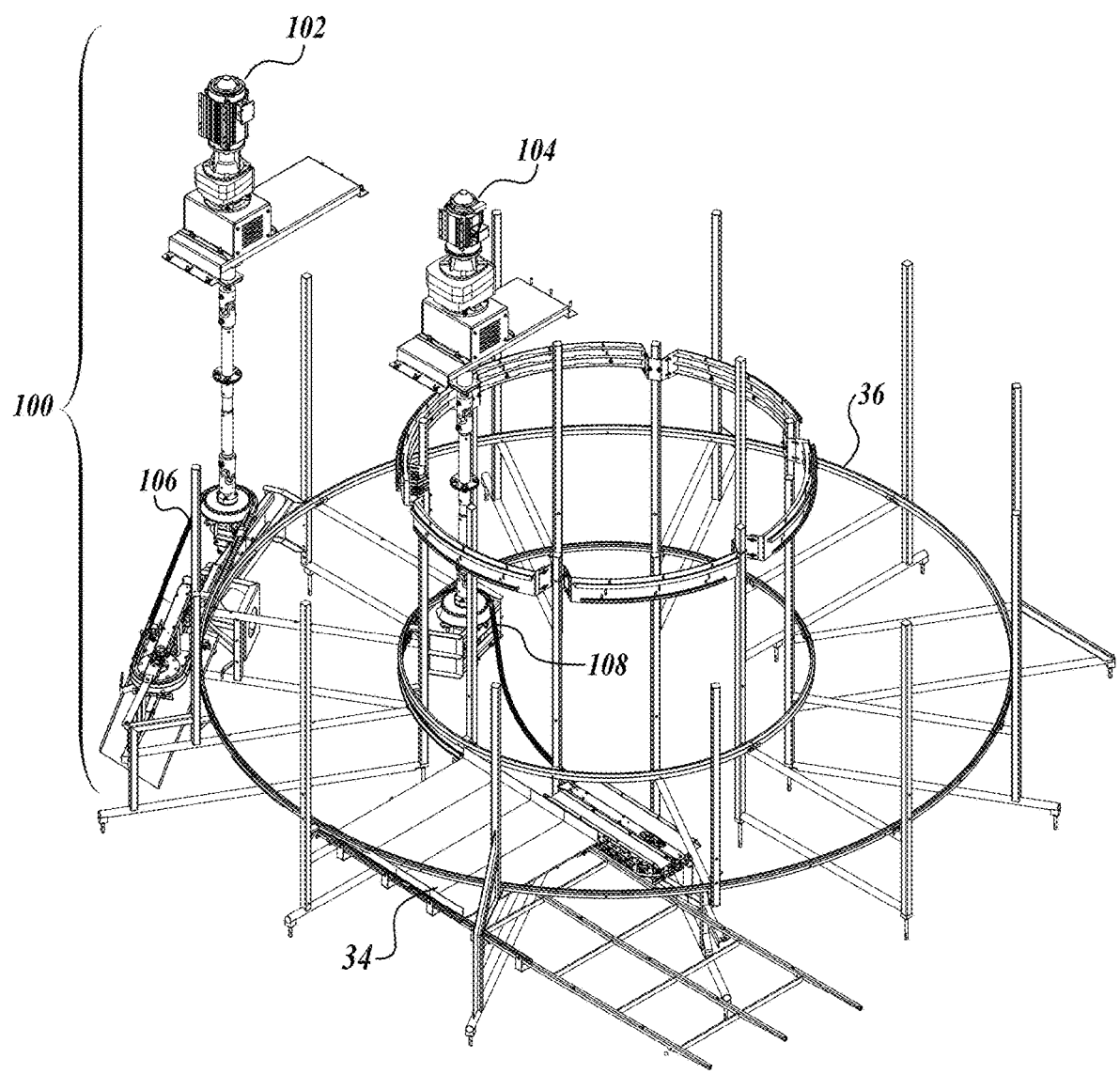
FIG. 9 is an isometric view of a frame a spiral self-stacking conveyor (such as the one shown in FIG. 1), including an exemplary sensing and drive speed pick-up system for chain wear elongation measurement and drive compensation in accordance with embodiments of the present disclosure.

Wear elongation can be calculated as follows:

Wear Elongation in per fraction of a chain pitch= ((Pulse Count Total per No. of travel cycles/No. travel cycles)−Pulse Count per cycle in pitches for whole chain lengths))/Pulses per Chain Pitch Total number of chain pitches per circuit length can be calculated as follows:

Measured Total Number of Chain Pitches per Circuit Length=((Revolutions in pulses/No. of Chain Travel Circuit Cycle)×No. Sprocket Teeth)+ ((Pulse Count Total per No. of travel cycles/No. travel cycles)−Pulse Count per cycle rounded to nearest pitch count in pulses)/Pulses per Chain Sensing System Referring to FIG. 9, an exemplary sensing system 100 for a spiral self-stacking conveyor belt system is provided. In the illustrated embodiment, the frame 36 supporting the spiral stack and a portion of the conveyor belt 34 is provided. The sensing system 100 includes the outer drive speed pick-up 102, which is configured to sense and count pulses per revolution to give an indication of links (or pitches) per full outer chain revolution, and the inner drive speed pick-up 104, which is configured to sense and count pulses per revolution to give an indication of links (or pitches) per full inner chain revolution.

The outer and inner chain cycle counter sensors 106 and 108 count one or more raised lobes mounted on each moving chain. These sensors can be located at any location on the chain paths of the inner and outer chains. In one embodiment, a single lobe is measure for whole chain length measurement. In another embodiment, multiple lobes are measured along the length of the chain.

Similar sensing systems can be used in conjunction with other embodiments of the present disclosure, such as two drive chain systems and single drive chain or conveyor chain systems. Other sensing systems and configurations are within the scope of the present disclosure. Moreover, sensors in the sensing systems may be remotely located outside the oven cooking zone or the freezer freezing zone so as not to be exposed to high heat or freezing conditions to extend the life of the sensors.

Tuning Drive Speed Based on Chain Wear Elongation

As discussed above, in one embodiment of the present disclosure, the chain wear measurement system measures individual chain wear values of the outer and inner drive chains, for example, of a spiral conveyor in the illustrated embodiment of FIGS. 1-3. Because chain wear elongation correlates directly with chain speed, chain wear elongation measurements can be used to tune the speed of a chain drive. Likewise, the ratio of chain wear elongation measurements from the inner to outer drives can be used as a multiplier adjustment to tune the speed of one or both of the drives.

In one embodiment, speed can be used to compensate for the wear elongation differential between the two chains driving the spiral belt movement. The wear elongation multiplier would be multiplied by the overall inner/outer drive ratio to create a speed tuning factor up or down in speed relative to one or both of the drives. Accordingly, speed tuning compensates for differential chain wear elongation between the drive chains.

In accordance with one embodiment of the present disclosure, the following method is applied for chain wear elongation measurement and drive speed tuning.

As an initial step, as described above, the electric motor revolutions per chain travel at the input shaft at each drive station location is sensed. Pulse counts coming from the sensor at the electric motor summated per sensed chain travel cycle equates with total number of chain pitches in each drive system.

As another initial step, the chain travel cycle per the entire circuit length is sensed. For example, by attaching sensor activation pick-ups to the drive chains in one place on each inner and outer drive systems. Sense the passing of the pick-up to sense the completed chain travel cycle.

After the sensing steps, the input data is used to determine chain wear elongation. For example, use of computer program logic per mathematical functions to define and apply a drive speed multiplier to adjust the speed to the measured states of chain wear elongation per independently controlled gear motor drives.

The result of drive speed compensation is synchronization between first and second independent drives (e.g., inner and outer drives) so they can be tuned for chain wear while creating a highly rigid and fixed relationship with an unyielding match ratio between first and second drives (e.g., inner and outer drives).

In accordance with another embodiment of the present disclosure, the following method is applied for chain wear elongation measurement and drive speed tuning for a single chain system.

As an initial step, as described above, the electric motor revolutions per chain travel at the input shaft at the drive station location is sensed. Pulse counts coming from the sensor at the electric motor summated per sensed chain travel cycle equates with total number of chain pitches in the drive system.

As another initial step, the chain travel cycle per the entire circuit length is sensed. For example, attach sensor activation pick-us to the drive chain in one place on the drive system. Sense the passing of the pick-up to sense the completed chain travel cycle.

After the sensing steps, use the input data to determine chain wear elongation. For example, use computer program logic per mathematical functions to define and apply a drive speed multiplier to adjust the speed to the measured states of chain wear elongation per independently controlled gear motor drives.

The result of drive speed compensation tuned for chain wear.

EXAMPLE 5

Chain Wear Elongation Determination and Drive Ratio Compensation

A machine at new set-up has an "as new-no chain wear" 552 pitches of outer and 396 pitches of inner chain and a 2.055:1 outer/inner speed ratio to have correct drive load characteristic. After a long period of service, differential chain wear elongation exists in the drive system. Use of the chain wear elongation determination and compensation method is applied resulting in a determination of 538 pitches of outer chain and 396 pitches of inner chain (reduced by maintenance removal of pitches over time) and a 2.000:1 outer/inner speed ratio (old worn outer chain ratio state). Such outer/inner speed ratio compensation avoided a situation in which the outer drive was over running the inner drive at a 2.5% wear elongation/speed differential. Supplemental fine tuning can be achieved by linear displacement sensing of chain tensioner positions to determine incremental wear fraction measures between whole pitch unit lengths.

Chain Replacement

As mentioned above, when a chain is worn to its pitch removal and elongation limits, the chain is replaced. In exemplary spiral conveyor systems, exemplary maintenance schedules include inner and outer chains being replaced together as new and outer chains can be replaced twice as often as inner chains. However, in some situations, chains (particularly inner chains) may be replaced when they have life remaining.

In accordance with embodiments of the present disclosure, systems and methods for chain wear elongation measurement and for chain speed control can be used to enhance the life cycles of the inner and outer chains. Such measurement and speed control may reduce the need to prematurely replace chains having life remaining (particularly lesser worn chains in dual-chain systems, such as inner chains in spiral conveyor systems).

While illustrative embodiments have been illustrated and described, it will be appreciated that various changes can be made therein without departing from the spirit and scope of the invention.

The embodiments of the invention in which an exclusive property or privilege is claimed are defined as follows:

1. A spiral conveyor belt system, comprising:
   a spiral conveyor belt;
   inner and outer drive chains driving the spiral conveyor belt, the inner and outer drive chains each including a plurality of links arranged in a continuous loop, the inner drive chain having inner chain first measurements for plurality of links and total chain length and the outer chain having outer chain first measurements for plurality of links and total chain length, wherein the inner and outer drive chains have different first measurement values and wherein the inner and outer drive chains are configured to run at different speeds having a first speed ratio; and
   a chain elongation measurement system for counting the plurality of links of the inner and outer drive chains and for determining total chain length to determine inner and outer chain elongated measurements.

2. The system of claim 1, wherein the chain elongation measurement system determines the inner and outer chain elongated measurements while the spiral conveyor belt system is running.

3. The system of claim 1, further comprising a speed controller for controlling the speed of at least one of the inner and outer drive chains based on the inner and outer chain elongated measurements to adjust the speed ratio of the inner and outer drive chains from a first speed ratio to a second elongated speed ratio.

4. The system of claim 1, further comprising an inner chain tensioner coupled to the inner drive chain and an outer chain tensioner coupled to the outer drive chain, wherein the chain elongation measurement system further measures the tensioner stroke of the inner chain tensioner in determining the inner chain elongated measurements and measures the tensioner stroke of the outer chain tensioner in determining the outer chain elongated measurements.

5. The system of claim 1, wherein the inner first chain measurement, the outer first chain measurement, or both are non-elongated chain measurements.

6. The system of claim 1, further comprising inner and outer drive speed pick-up systems.

7. The system of claim 6, wherein a first sensor for counting the plurality of links of the inner drive chain as it moves is located at the inner drive speed pick-up system, and wherein a second sensor for counting the plurality of links of the outer drive chain as it moves is located at the outer drive speed pick up system.

8. The system of claim 6, wherein a third sensor counts total chain length of the inner drive chain by sensing one or more lobes on the inner drive chain as it moves, and wherein a fourth sensor counts total chain length of the outer drive chain by sensing one or more lobes on the outer drive chain as it moves.

9. The system of claim 1, wherein the inner and outer drive chains are ball drive chains or roller drive chains.

10. A method for chain elongation measurement and/or drive compensation in spiral self-stacking conveyor belt system having inner and outer drive chains, the method comprising:
    obtaining first chain measurement values including a first number of links and a first total chain length for each of the inner and outer drive chains, wherein the inner and outer drive chains have different first measurement values and wherein the inner and outer drive chains are configured to run at different speeds having a first speed ratio;
    after running the spiral self-stacking conveyor belt system for a period of time, counting the number of links of each of the inner and outer drive chains and determining total chain length of each of the inner and outer drive chains; and
    determining chain elongation measurement values for each of the inner and outer drive chains by comparing counted number of links and counted total chain length with the first number of links and the first total chain length for each of the inner and outer drive chains.

11. The method of claim 10, further comprising determining a relationship between the chain elongation measurement values of the inner drive chain and the outer drive chain.

12. The method of claim 11, further comprising adjusting the speed of at least one of the inner and outer drive chains to change the speed ratio between the inner and outer drive chains based on the relationship between the chain elongation measurement values of the inner drive chain and the outer drive chain from the first speed ratio to a second elongated speed ratio.

13. The method of claim 10, wherein determining chain elongation measurement values for each of the inner and outer drive chains further includes measuring the tensioner stroke of an inner chain tensioner coupled to the inner drive chain and measuring the tensioner stroke of an outer chain tensioner coupled to the outer drive chain.

14. The method of claim 10, wherein at least one of a worn inner and outer drive chains is replaced.

15. The method of claim 14, wherein the worn inner and outer drive chains are replaced at the same time or at a different time.

* * * * *